(12) United States Patent
Odamura

(10) Patent No.: US 7,640,371 B2
(45) Date of Patent: Dec. 29, 2009

(54) INTEGRATED CIRCUIT AND INFORMATION PROCESSING APPARATUS

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 498 days.

(21) Appl. No.: 10/909,364

(22) Filed: Aug. 3, 2004

(65) Prior Publication Data

US 2005/0091421 A1 Apr. 28, 2005

(30) Foreign Application Priority Data

Aug. 4, 2003 (JP) ............................. 2003-285732

(51) Int. Cl.
*G06F 3/00* (2006.01)
(52) U.S. Cl. .................... 710/14; 711/170; 370/310
(58) Field of Classification Search .............. 710/1–74; 709/201–253; 711/170
See application file for complete search history.

(56) References Cited

U.S. PATENT DOCUMENTS

| | | | |
|---|---|---|---|
| 5,434,976 A * | 7/1995 | Tan et al. .................... 709/234 |
| 5,537,626 A * | 7/1996 | Kraslavsky et al. ............ 710/8 |
| 5,659,801 A * | 8/1997 | Kopsaftis ..................... 710/62 |
| 5,696,920 A * | 12/1997 | Miyata et al. ................ 712/201 |
| 5,717,647 A | 2/1998 | Hush et al. |
| 5,742,502 A * | 4/1998 | King ............................ 710/61 |
| 5,983,291 A * | 11/1999 | Leger et al. ................... 710/52 |
| 6,115,760 A * | 9/2000 | Lo et al. ....................... 710/52 |
| 6,202,116 B1 * | 3/2001 | Hewitt ........................ 710/305 |
| 6,209,045 B1 * | 3/2001 | Hasegawa et al. ............. 710/15 |
| 6,223,298 B1 * | 4/2001 | Tellier et al. ................ 713/501 |
| 6,529,970 B1 * | 3/2003 | Sarpangal .................... 710/33 |
| 6,816,929 B2 * | 11/2004 | Ueda ........................... 710/56 |
| 6,898,646 B1 * | 5/2005 | Bonola et al. ................. 710/22 |
| 2002/0083042 A1 * | 6/2002 | Sasoh ........................... 707/1 |

FOREIGN PATENT DOCUMENTS

| | | |
|---|---|---|
| JP | 61-117643 A | 6/1986 |
| JP | H07-312627 A | 11/1995 |
| JP | 2000-207190 A | 7/2000 |
| JP | 2002-358177 A | 12/2000 |
| JP | 2001-134543 A | 5/2001 |
| JP | 2003-029809 A | 1/2003 |
| WO | 01/71514 A2 | 9/2001 |

* cited by examiner

*Primary Examiner*—Henry W. H. Tsai
*Assistant Examiner*—Elias Mamo
(74) *Attorney, Agent, or Firm*—Sughrue Mion, PLLC

(57) ABSTRACT

When a program from a master device 1 is received during a burst mode, a slave device 2 judges that an address field is also treated as a data field and extracts data in the address field as the program. The slave device 2 uses a transmission FIFO 222 as an extension FIFO of a reception FIFO 224 during the burst mode.

18 Claims, 19 Drawing Sheets

INTEGRATED CIRCUIT AND INFORMATION PROCESSING APPARATUS

This application claims priority to prior Japanese application JP 2003-285732, the disclosure of which is incorporated herein by reference.

BACKGROUND OF THE INVENTION

This invention relates to an integrated circuit comprising a CPU for downloading a program via serial communication and executing the program and to an information processing apparatus, such as a mobile telephone and a computer, having the above-mentioned integrated circuit.

In order to achieve or add a particular function in an existing integrated circuit, such as an LSI containing a CPU, a program to be executed by the CPU to achieve or add the particular function is stored in a mask ROM.

Recently, however, following an increase in complexity of a system and an increase in scale of the program, there is an increasing risk of occurrence of defects or troubles after the program is stored in the mask ROM.

In view of the above, in the integrated circuit of the type, it is proposed to store the program in a rewritable nonvolatile memory (flash memory). Upon occurrence of defects or troubles, the program is updated by rewriting.

However, since the nonvolatile memory is generally an external memory, there arises a problem that a mounting area is increased and a production cost is elevated.

Taking the above into consideration, it is proposed that the integrated circuit of the type is provided with an internal RAM. The program downloaded from a superior or master integrated circuit is stored in the RAM and then executed by the CPU.

Hereinafter, description will be made of an existing information processing apparatus having an integrated circuit in which a program downloaded via serial communication is stored in a RAM and then executed by a CPU.

Referring to FIG. 1, the existing information processing apparatus comprises a master device 8 and a slave device 9.

The master device 8 is an LSI comprising a CPU 81 and a synchronous serial interface (SSI) 82 as a master interface.

The slave device 9 is an LSI comprising a CPU 91 adapted to download a program from the master device 8 via serial communication and to execute the program. The CPU 91 is connected to a ROM 93 and a RAM 94 through a bus control circuit 95. The ROM 93 stores a program for executing a downloading operation. The RAM 94 serves to store the program downloaded from the master device 8 to be executed by the CPU 91, together with work data.

The slave device 9 further comprises a synchronous serial interface (SSI) 92 as a slave interface for carrying out communication with the master device 8 through a communication path/control signal line 10 and for downloading a program from the master device 8.

Next referring to FIG. 2, description will be made of the structure of the synchronous serial interface 92 in the slave device 9.

Referring to FIG. 2, the synchronous serial interface 92 in the existing information processing apparatus comprises a bus interface circuit 921 connected to the CPU 91 through the bus control circuit 95, a transmission FIFO 922 and a transmission circuit 923 arranged on a transmitting side, a reception FIFO 924 and a reception circuit or receiver circuit 925 arranged on a receiving side, and a timing control circuit 926 for carrying out control related to communication processing.

In case where data from the CPU 91 is transmitted to the master device 8, the timing control circuit 926 transmits the data through the transmission FIFO 922 and the transmission circuit or transmitter circuit 923. On the other hand, in case where data from the master device 8 is received, the timing control circuit 926 makes the reception FIFO 924 store the data transmitted from the master device 8 and received by the reception circuit 925. The data stored in the reception FIFO 924 is read out by the CPU 91 through the bus interface circuit 921.

Hereinafter, operation of the existing information processing apparatus will be described. Herein, description will be made of the case where the slave device 9 downloads a program from the master device 8 via four-wire synchronous serial communication using four signal lines for a chip select (CS), clock (CLK), output data or serial-data-out (SDO), and input data or serial-data-in (SDI).

Referring to FIGS. 3 and 4, operation of the master device 8 will be described. In FIGS. 3 and 4, CS, CLK, and SDO represent the chip select, the clock, and the output data produced by the master device 8, respectively. In FIG. 4, SDI represents the input data supplied to the master device 8.

Referring to FIGS. 3 and 4, the output data (SDO) from the master device 8 has a format including an address/control field (hereinafter referred to as an address field, the field having the length of 8 bits in FIGS. 3 and 4) and a data field (the field having the length of 8 bits in FIGS. 3 and 4) following the address field. FIG. 3 shows the case where data is transferred from the master device 8 to the slave device 9. FIG. 4 shows the case where a data transfer request is sent from the slave device 9 to the master device 8. Although not illustrated in the figure, the output data (SDO) from the slave device 9 has a similar format containing an address field and a data field following the address field.

When data is received by the reception circuit 925, the slave device 9 judges, with reference to setting of the address field of the data, whether incoming data from the master device 8 is being received or outgoing data is being transmitted to the master device 8.

Specifically, in the slave device 9, the reception circuit 925 receives the data in the address field and transmits it to the timing control circuit 926. When it is judged with reference to the setting of the address field data that the outgoing data is being transmitted to the master device 8, the timing control circuit 926 read the data from the transmission FIFO 922 into the data field and transmits the data through the transmission circuit 923. On the other hand, if it is judged that the incoming data from the master device 8 is being received, the data in the data field received by the reception circuit 925 is stored in the reception FIFO 924 as shown in FIG. 5. In FIG. 5, CS, CLK, and SDI represents a chip select, clock, and input data or serial-data-in supplied from the master device 8 to the slave device 9, respectively, and Reception FIFO represents the data stored in the reception FIFO 924 in the slave device 9.

The above-mentioned technique of transferring data, such as a program, between the master and the slave devices is disclosed, for example, in Japanese PatentApplication Publications (JP-A) Nos. H07-312627, 2001-134543, and 2003-029809.

However, the existing information processing apparatus is disadvantageous in the following respects. In case where the program is increased in size, it takes a very long time for a lower or slave integrated circuit to download the program by the use of a typical interface such as UART (Universal Asynchronous Receiver Transmitter). In order to download the program at a high speed, the lower integrated circuit must have a specific or exclusive-use high-speed interface.

In the existing information processing apparatus, only one byte of significant data (program) can be transferred in one-chip transfer as shown in FIG. 5, resulting in decrease of the throughput. Therefore, much longer time is required to download the program.

SUMMARY OF THE INVENTION

It is therefore an object of this invention to provide an integrated circuit capable of reducing a time required to download a program without using a high-speed interface and to provide an information processing apparatus comprising the integrated circuit.

According to this invention, there is provided an integrated circuit having a CPU for downloading a program from another integrated circuit via serial communication and executing the program, wherein the integrated circuit comprises an interface circuit for judging that a format of reception data is modified and extracting the program from the reception data when the reception data containing the program is downloaded and received from the above-mentioned another integrated circuit and if the interface circuit is set in a specific mode.

Specifically, when the reception data containing the program is received from the above-mentioned another integrated circuit and if the interface circuit is set in the specific mode, the interface circuit judges that the program is contained not only in a data field of the reception data but also in a field other than the data field, and extracts the program from the reception data.

The interface circuit may be set in the specific mode in response to a signal transmitted from the above-mentioned another integrated circuit. The CPU may set the interface circuit in the specific mode in response to a command transmitted from the above-mentioned another integrated circuit.

The interface circuit comprises a transmission memory for storing transmission data to be transmitted to the above-mentioned another integrated circuit during a normal mode, a reception memory for storing the program contained in the reception data received from the above-mentioned another integrated circuit during the normal mode, and a timing control circuit for carrying out control such that, during the normal mode, the program contained in the reception data received from the above-mentioned another integrated circuit is stored only in the reception memory and that, during the specific mode, the program contained in the reception data received from the above-mentioned another integrated circuit is stored in both of the transmission memory and the reception memory.

According to this invention, there is also provided an information processing apparatus comprising a first integrated circuit and a second integrated circuit having a CPU for downloading a program from the first integrated circuit via serial communication and executing the program, wherein the second integrated circuit comprises an interface circuit for judging that a format of reception data is modified and extracting the program from the reception data when the reception data containing the program is downloaded and received from the first integrated circuit and if the interface circuit is set in a specific mode.

As described above, the integrated circuit according to this invention comprises a CPU for downloading a program from another integrated circuit via serial communication and executing the program, and an interface circuit for judging that a format of reception data is modified and extracting the program from the reception data when the reception data containing the program is downloaded and received from the above-mentioned another integrated circuit and if the interface circuit is set in a specific mode.

Specifically, if the interface circuit is set in the specific mode, the interface circuit judges that the program is contained not only in a data field of the reception data but also in a field other than the data field and extracts the program from the reception data.

Therefore, in the above-mentioned another integrated circuit, it is possible to store the program also in a field other than the data field and generally used to store address data or control data. As a consequence, a large amount of programs can be one-directionally transferred without redundancy. Accordingly, the throughput is improved and the transfer speed is increased.

Since the integrated circuit according to this invention comprises the above-mentioned interface circuit, a typical synchronous serial communication system can easily be extended and a high-speed interface exclusively for downloading is unnecessary.

In the integrated circuit according to this invention, the interface circuit comprises the transmission memory, the reception memory, and the timing control circuit for carrying out control such that, during the specific mode, the program contained in the reception data is stored in both of the transmission memory and the reception memory.

With the above-mentioned structure, the transmission memory can be used as an extension memory of the reception memory during the specific mode. Accordingly, as compared with a structure provided with a reception memory of a large capacity, it is possible to reduce a circuit scale.

DESCRIPTION OF THE PREFERRED EMBODIMENTS

Figure 1:
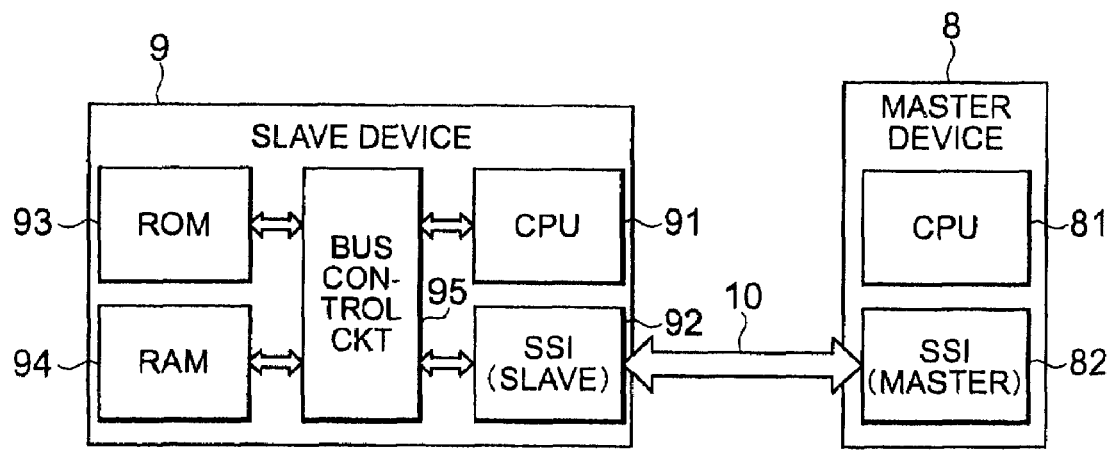
FIG. 1 is a view showing an existing information processing apparatus.

Now, description will be made of preferred embodiments of this invention with reference to the drawing.

First Embodiment

Figure 6:
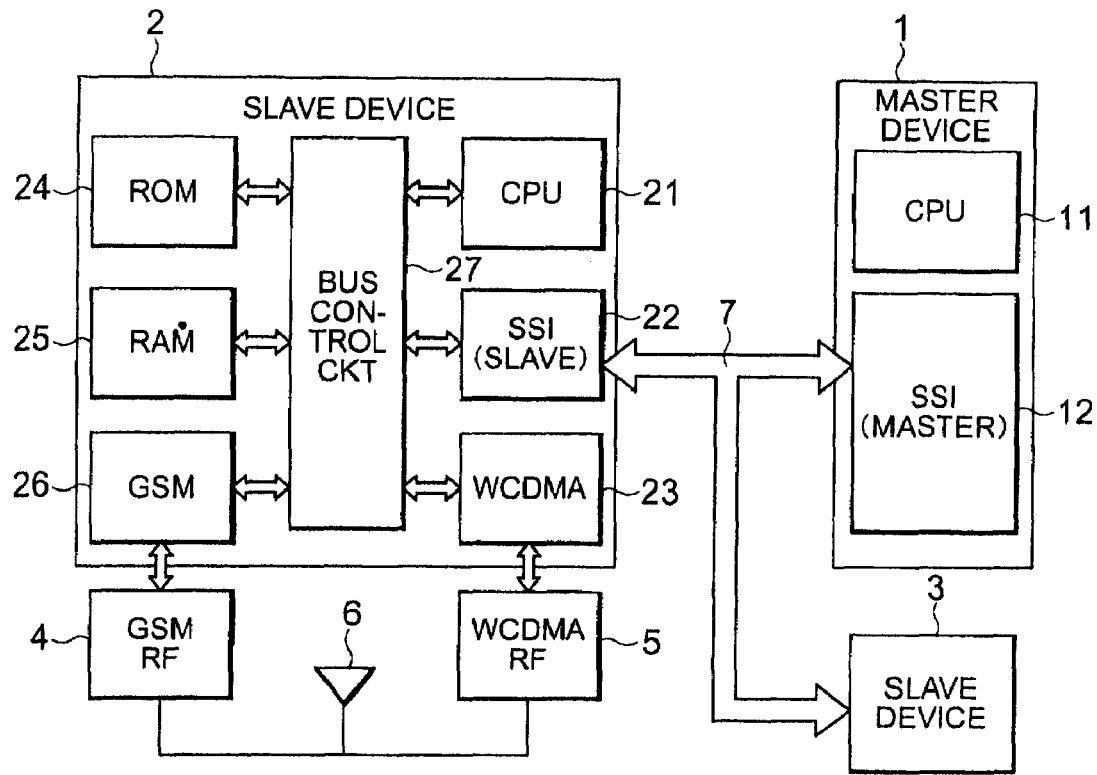
FIG. 6 is a view showing an information processing apparatus according to this invention.

Referring to FIG. 6, the information processing apparatus according to this invention is applied to a mobile telephone. The information processing apparatus comprises a master device 1, a slave device 2 for executing protocol processing, and a slave device 3 for executing processing of other peripheral functions.

The information processing apparatus illustrated in FIG. 6 comprises a GSM (Global System for Mobil Communications) RF section 4, a W-CDMA (Wide-Band CDMA) RF section 5, and an antenna 6. Through the antenna 6, the information processing apparatus communicates with a base station (not shown) according to either one of the communication systems GSM and W-CDMA.

The master device 1 is an LSI comprising a CPU 11 and a synchronous serial interface (SSI) 12 as a master interface.

The slave device 2 is a protocol LSI which comprises a CPU 21 for downloading a program from the master device 1 via synchronous serial communication and executing the program and which is adaptable to a plurality of communication systems. The CPU 21 is connected to a ROM 24 and a RAM 25 through a bus control circuit 27. The ROM 24 stores a program for executing a downloading operation. The RAM 25 serves to store the program downloaded from the master device 1 to be executed by the CPU 21, together with work data.

The slave device 2 comprises a GSM base-band processing section 26 and a W-CDMA base-band processing section 23. In dependence upon the program executed by the CPU 21, the slave device 2 is adaptable to one or both of the communication systems GSM and W-CDMA.

The slave device 2 further comprises a synchronous serial interface (SSI) 22 for carrying out communication with the master device 1 via a communication path/control signal line 7 and for downloading the program from the master device 1.

The slave device 3 is a power-control LSI or a sound-source LSI connected to the master device 1 via the communication path/control signal line 7.

Now, referring to FIG. 7, description will be made of the structure of the synchronous serial interface 22 in the slave device 2.

Figure 7:
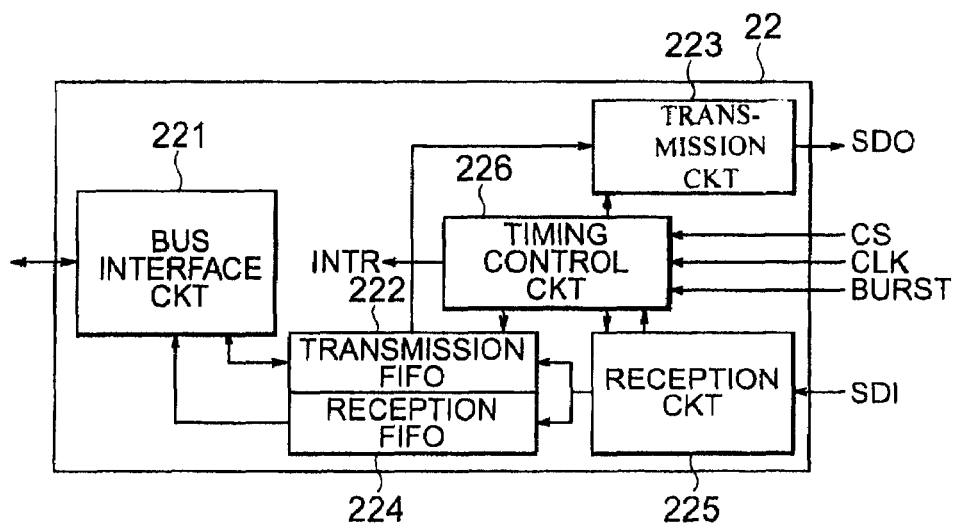
FIG. 7 is a view showing a synchronous serial interface according to a first embodiment of this invention.

Referring to FIG. 7, the synchronous serial interface 22 according to this embodiment comprises a bus interface circuit 221 connected through the bus control circuit 27 to the CPU 21, a transmission FIFO 222 and a transmission circuit (transmitter circuit) 223 arranged on a transmission side, a reception FIFO 224 and a reception circuit (receiver circuit) 225 arranged on a reception side, and a timing control circuit 226 for carrying out control related to communication processing.

Figure 2:
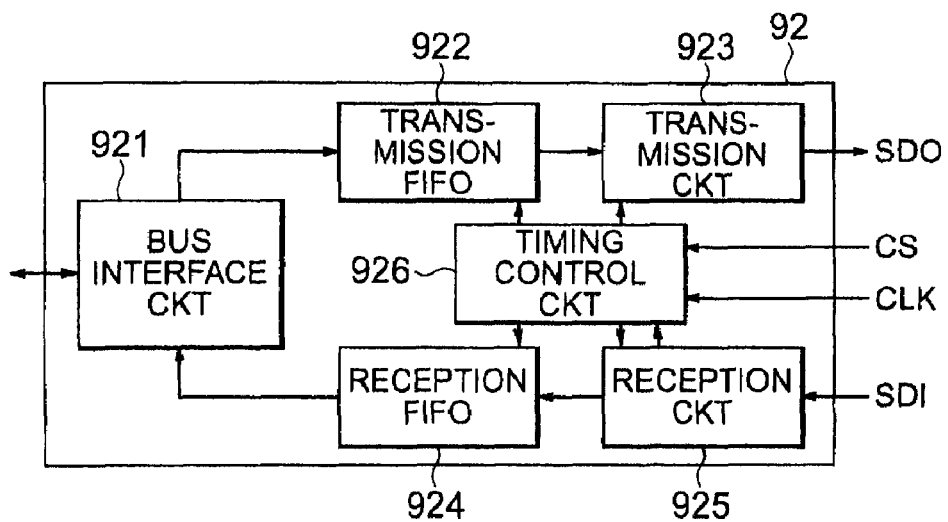
FIG. 2 is a view showing a synchronous serial interface in the existing information processing apparatus in FIG. 1.

The synchronous serial interface 22 according to this embodiment is different from that illustrated in FIG. 2 in the following respect. In dependence upon the state of a burst (BURST) signal controlled by the master device 1, the synchronous serial interface 22 judges that a format of reception data from the master device 1 is modified, and switches a function of the transmission FIFO 222 so that the transmission FIFO 222 operates as an extension FIFO of the reception FIFO 224.

Specifically, when the slave device 2 receives the reception data from the master device 1 via four-wire synchronous serial communication, the timing control circuit 226 makes the transmission FIFO 222 store the data in an address/control field (hereinafter referred to as an address field) of the reception data and makes the reception FIFO 224 store the data in a data field following the address field if the burst signal is set active.

When the transmission FIFO 222 and the reception FIFO 224 are completely filled, the timing control circuit 226 transmits an interrupt (INTR) signal to the CPU 21 through the bus interface circuit 221. Supplied with the interrupt (INTR) signal from the timing control circuit 226, the CPU 21 reads the reception data through the bus interface circuit 221 from the transmission FIFO 222 and the reception FIFO 224, transfers the reception data to a program area on the RAM 25. Then, the slave device 2 is ready for next reception.

Thus, in case where the burst signal is set active, the timing control circuit 226 judges that the address field is treated as the data field, extracts the data in the address field as significant data (such as a program), and carries out subsequent processing.

Figure 3:
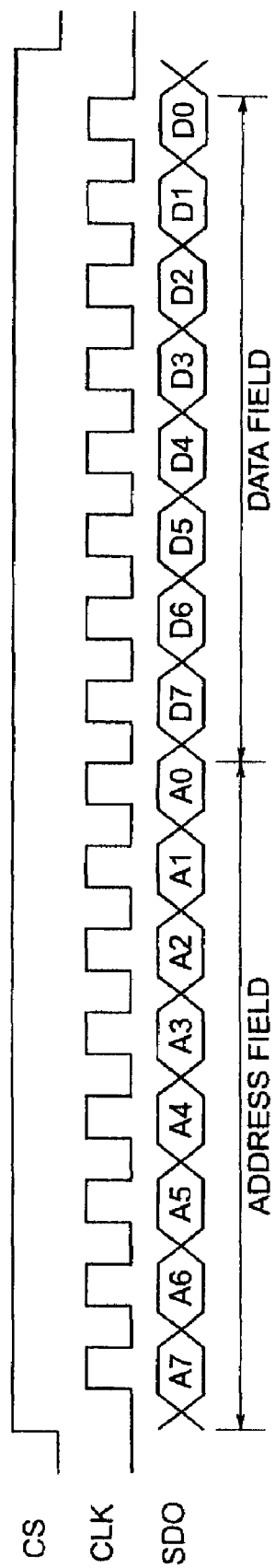
FIG. 3 is a timing chart for describing an example of operation of a master device in the existing information processing apparatus in FIG. 1.
Figure 4:
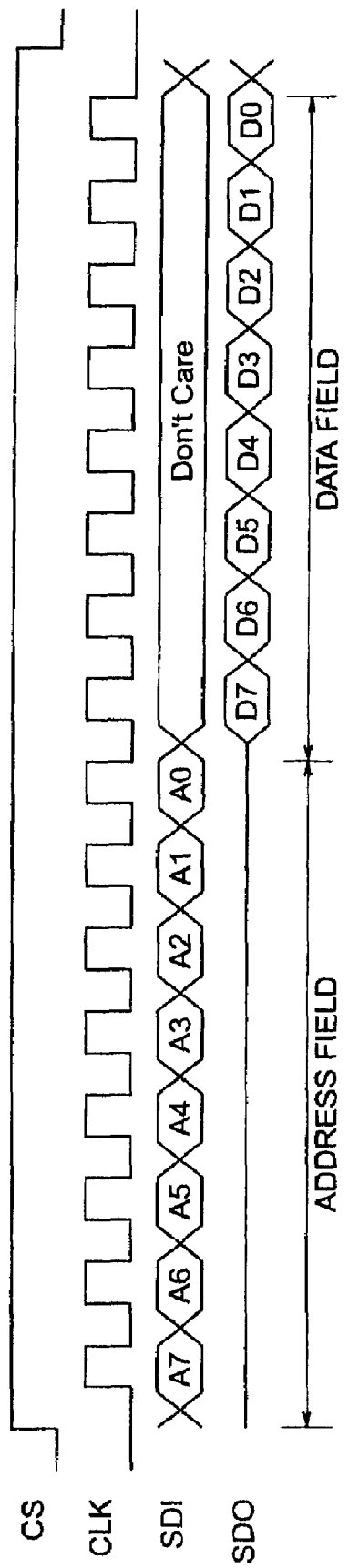
FIG. 4 is a timing chart for describing another example of operation of the master device in the existing information processing apparatus in FIG. 1.
Figure 5:
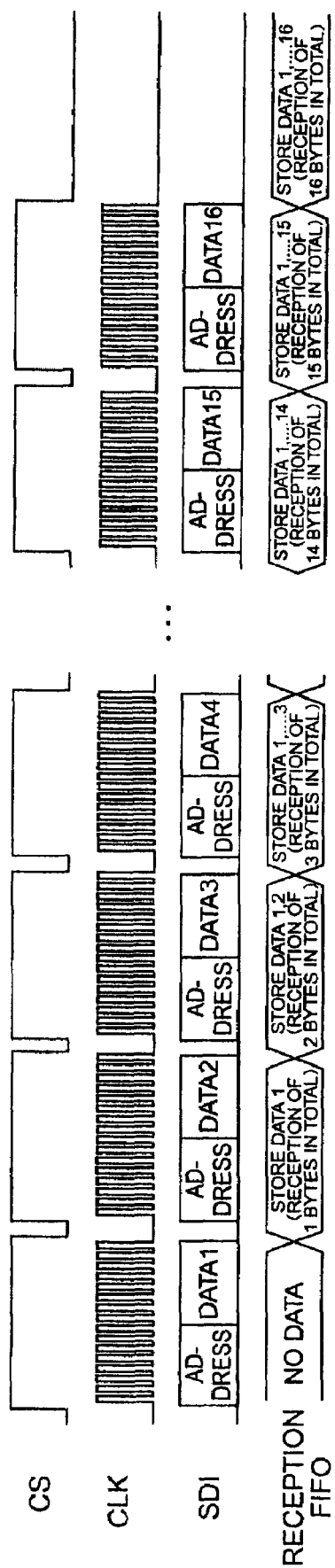
FIG. 5 is a timing chart for describing an example of operation of a slave device in the existing information processing apparatus in FIG. 1.
Figure 8:
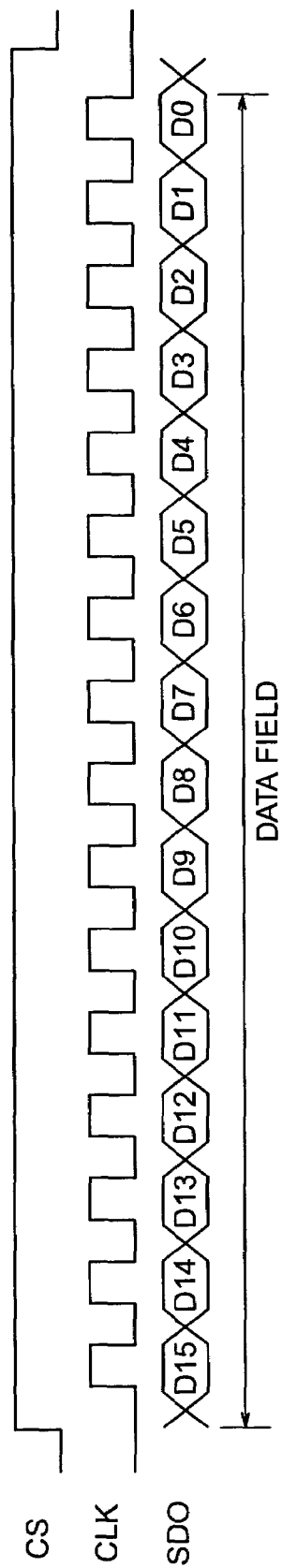
FIG. 8 is a timing chart for describing an example of operation of a master device in the first embodiment.

Therefore, unlike the example illustrated in FIG. 3, the master device 1 can transfer the data, treating the address field as the data field, as shown in FIG. 8. Accordingly, all bits of the data may possibly be significant data (such as a program) without the redundancy of the address field. In FIG. 8, CS, CLK, and SDO represent a chip select, clock, and output data or serial-data-out produced by the master device 1, respectively.

Upon reception of the data from the master device 1 via four-wire synchronous serial communication and if the burst signal is set inactive, the timing control circuit 226 merely makes the reception FIFO 224 store the data in the data field in accordance with the setting in the address field, in the manner similar to that described in conjunction with the existing apparatus.

Next, operation of the first embodiment will be described. Herein, description will be made of the case where the slave device 2 downloads the program from the master device 1 via four-wire synchronous serial communication. In this case, the program to be downloaded may be a protocol stack or a signal processing program which is required in the slave device 2 depending upon the type of a network used after the slave device 2 is started or a reset state is canceled (this also applies to second and third embodiments which will later be described).

Figure 9:
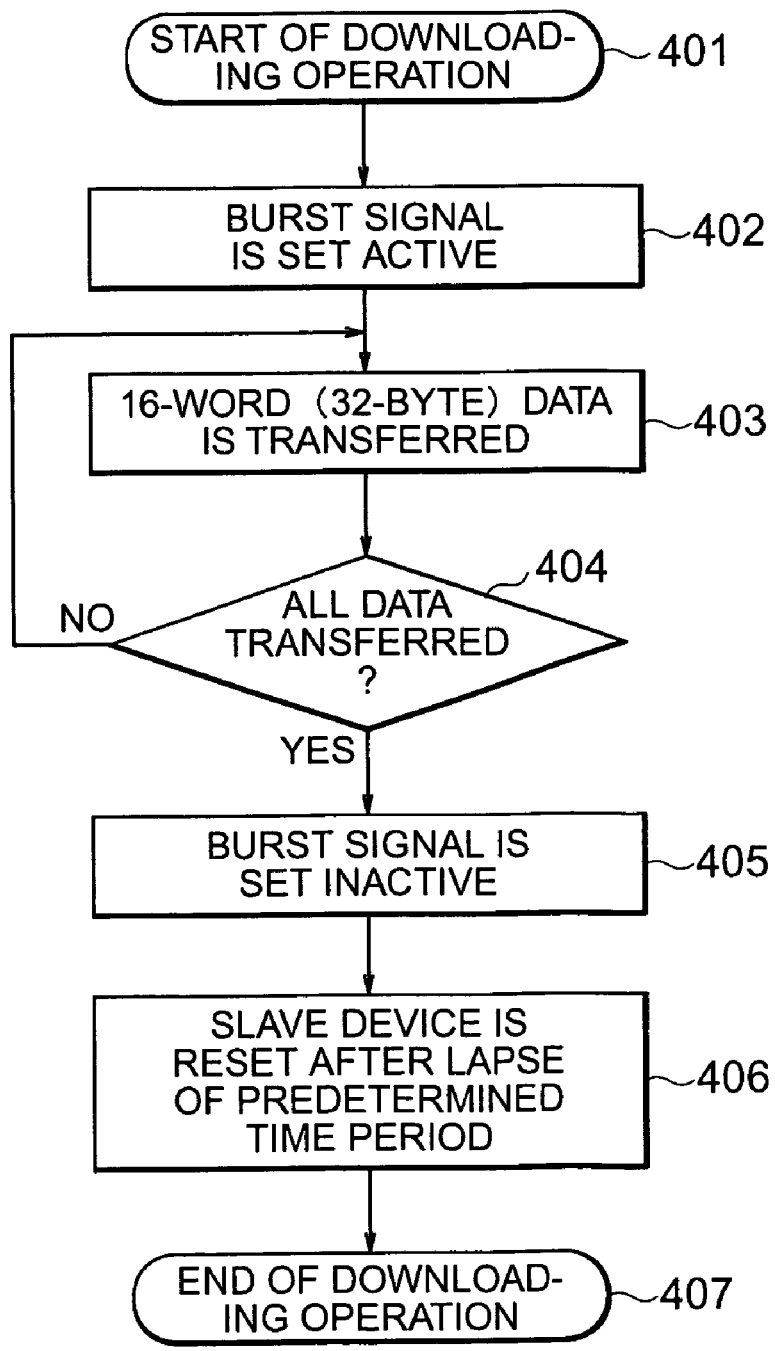
FIG. 9 is a flow chart for describing the example of operation of the master device in the first embodiment.
Figure 10:
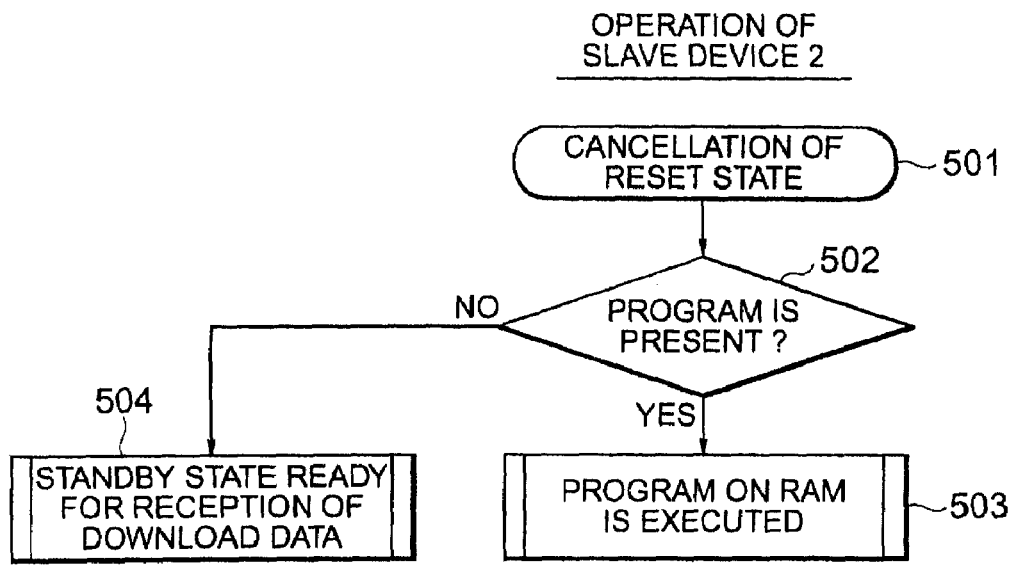
FIG. 10 is a flow chart for describing an example of operation of a slave device in the first embodiment.
Figure 11:
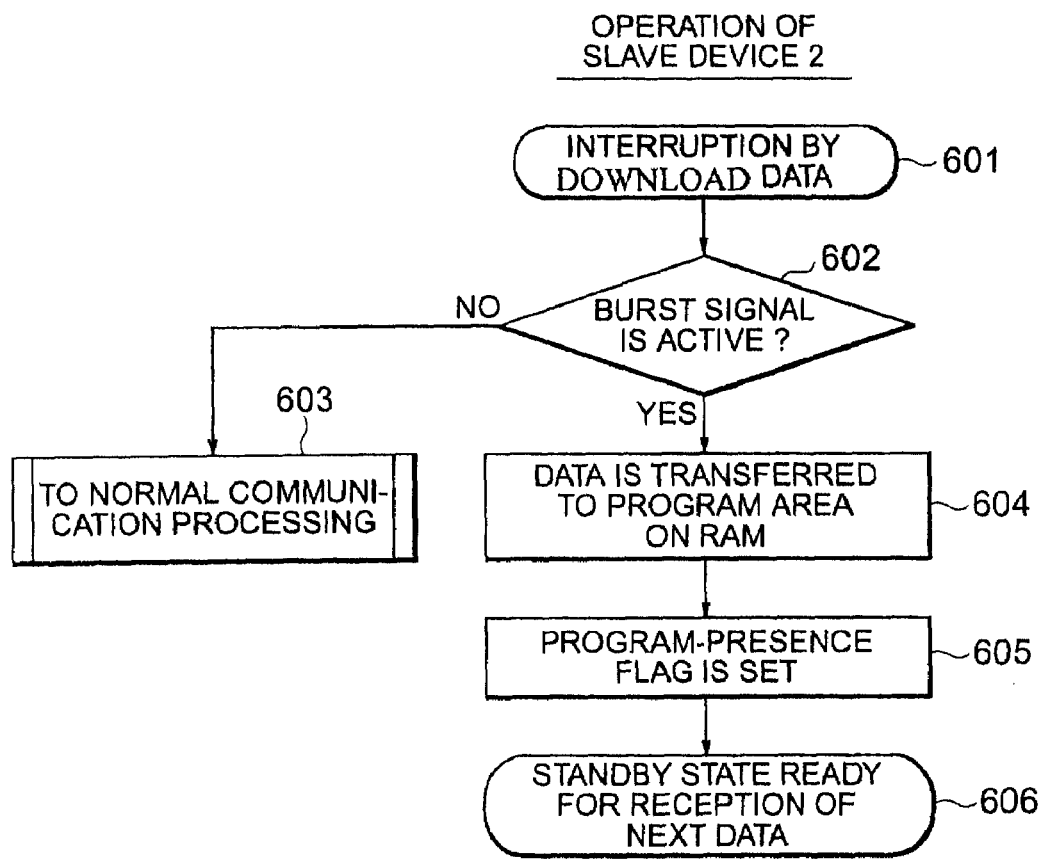
FIG. 11 is a flow chart for describing another example of operation of the slave device in the first embodiment.
Figure 12:
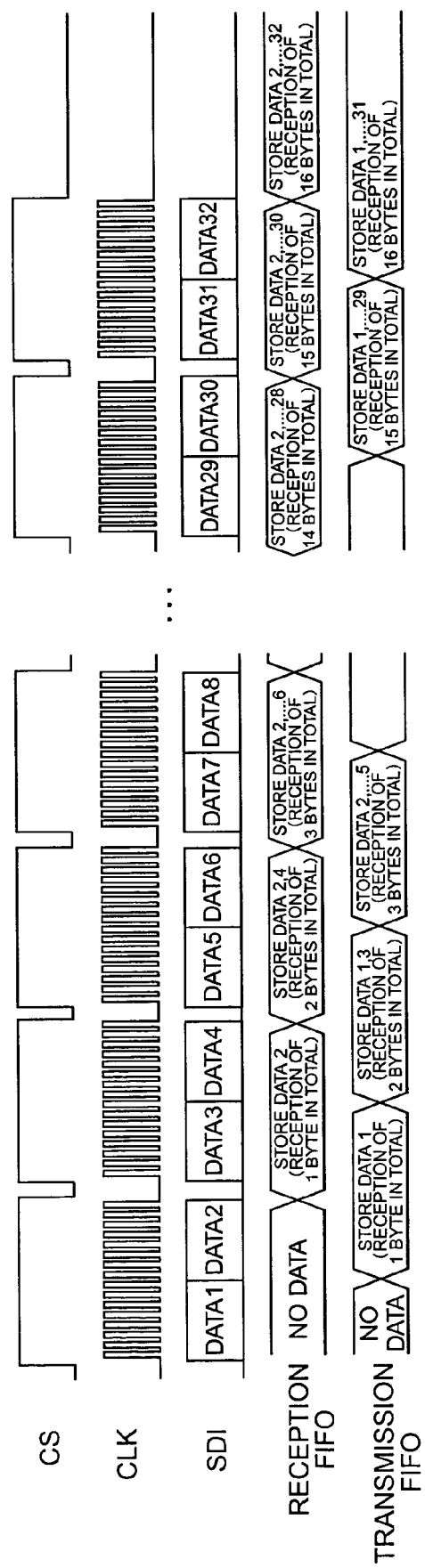
FIG. 12 is a timing chart for describing the example of operation of the slave device in the first embodiment.

Referring to FIG. 9, operation of the master device 1 will be described. Referring to FIGS. 10, 11, and 12, operation of the slave device 2 will be described. In FIG. 12, CS, CLK, and SDI represent a chip select, clock, and input data supplied from the master device 8, respectively Reception FIFO and Transmission FIFO represent the data stored in the reception FIFO 224 and the transmission FIFO 222, respectively.

Referring to FIG. 9, in the master device 1, the CPU 11 starts operation of downloading the program (step 401). At first, the burst signal is set active (step 402).

Next, the CPU 11 transfers, among all data of the program, first 16-word data corresponding to the capacity of the transmission FIFO 222 and the reception FIFO 224 in the slave device 2 (step 403). In this event, the CPU 11 transfers, as transmission data, the first 16-word data after modifying the format of the transmission data by treating the address field as the data field. In this embodiment, each of the transmission FIFO 222 and the reception FIFO 224 is a 16-byte FIFO. Therefore, the CPU 11 transfers 32-byte (16-word) data in total.

Next, the CPU 11 judges whether or not transfer of all data of the program has been completed (step 404). If not, the CPU 11 transfers another 16-word (32-byte) data again.

Upon completion of transfer of all data of the program, the CPU 11 sets the burst signal inactive (step 405). Taking into account the processing time in the slave device 2, the CPU 11 resets the slave device 2 after lapse of a predetermined time period (step 406). Then, the downloading operation comes to an end (step 407).

Referring to FIG. 10, the slave device 2 is started or the reset state is canceled (step 501). The CPU 21 carries out a starting operation in accordance with a starting program on the ROM 24 and judges whether or not any program is present on the RAM 25 (step 502). In presence of the program on the RAM 25, the CPU 21 executes the program on the RAM 25 (step 503).

In absence of any program on the RAM 25, the CPU 21 starts a downloading program on the ROM 24 for executing the downloading operation, and is turned into a standby state ready for reception of download data (step 504).

Referring to FIG. 11, it is assumed that the slave device 2 receives the download data from the master device 1 in the state at the step 504 in FIG. 10 (step 601). Then, the timing control circuit 226 judges whether or not the burst signal is active (step 602). If the burst signal is not active, the timing control circuit 226 judges that the data from the master device 1 is normal data (i.e., the data whose address field does not contain the program), and carries out control for normal communication processing (step 603). Specifically, the timing control circuit 226 merely makes the reception FIFO 224 store the data in the data field of the download data from the master device 1 but does not make the transmission FIFO 222 store the data in the address field.

On the other hand, if the burst signal is active, the timing control circuit 226 makes the transmission FIFO 222 store the data in the address field of the download data from the master device 1 and further makes the reception FIFO 224 store the data in the data field following the address field. When the transmission FIFO 222 and the reception FIFO 224 are completely filled, the timing control circuit 226 sets an interrupt (INTR) signal to the CPU 21 active. When the interrupt (INTR) signal is set active, the CPU 21 reads the data in the transmission FIFO 222 and in the reception FIFO 224, transfers the data to the program area on the RAM 25 (step 604), and sets a program-presence flag (step 605).

Thereafter, the CPU 21 is turned into a standby state ready for reception of next download data (step 606).

As described above, in this embodiment, the slave device 2 judges that the address field is treated as the data field, when the burst signal is set active. The data in the address field is also taken as significant data (such as a program) and subsequent processing is carried out.

Therefore, the master device 1 can transfer the data to the slave device 2 in a burst state, including the significant data (program) in both of the address field and the data field. Consequently, the throughput is improved and the downloading time is shortened (hereinafter, this operation mode will be referred to as a burst mode).

In this embodiment, the slave device 2 uses the transmission FIFO 222 as an extension FIFO of the reception FIFO 224 during the burst mode. Therefore, as compared with a structure provided with a reception FIFO 224 having a large capacity, it is possible to reduce a circuit scale.

In this embodiment, description has been made about the case where the address field is treated as the data field. However, this invention also includes the case where the length of the data field is increased (for example, from 8 bits to 16 bits) while the address field is unchanged.

Second Embodiment

The information processing apparatus in this embodiment carries out hand-shaking between the master device 1 and the slave device 2 when the program is downloaded from the master device 1 to the slave device 2.

The information processing apparatus in this embodiment is similar in structure to the first embodiment except that the synchronous serial interface 22 in the slave device 2 has an internal structure different from that of the first embodiment.

Figure 13:
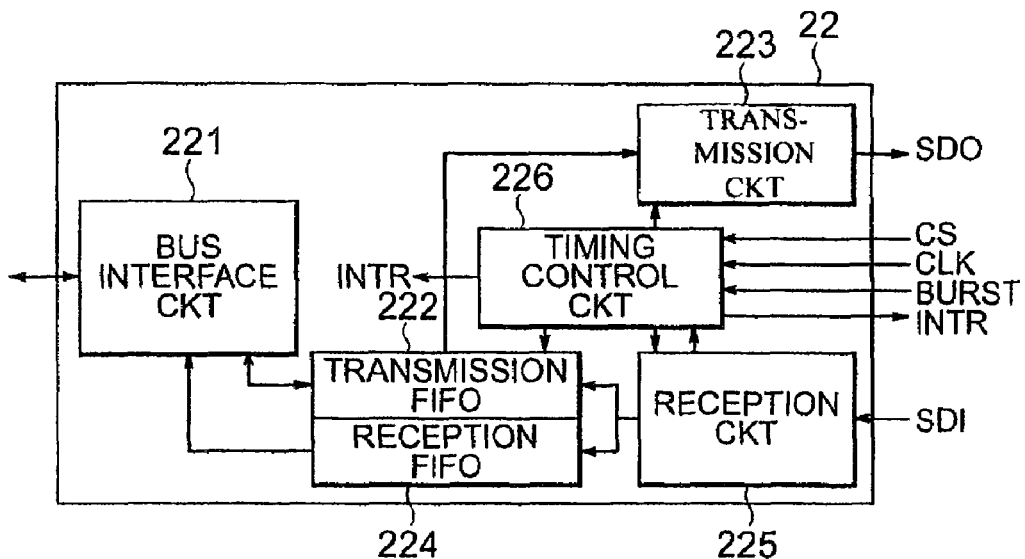
FIG. 13 is a view showing a synchronous serial interface according to a second embodiment of this invention.

Referring to FIG. 13, the synchronous serial interface 22 according to the second embodiment is different from the first embodiment in FIG. 7 in that an interrupt (INTR) signal from the timing control circuit 226 to the master device 1 is added.

The interrupt (INTR) signal may be set active or inactive by the CPU 21. Alternatively, the interrupt (INTR) signal may be automatically set active and inactive on a hardware basis, i.e., if the transmission FIFO 222 and the reception FIFO 224 are empty and are not empty, respectively. In the illustrated example, the interrupt (INTR) signal is set by the CPU 21.

Next, operation of this embodiment will be described. Herein, description will be made of the case where the slave device 2 downloads the program from the master device 1 via four-wire synchronous serial communication.

Figure 14:
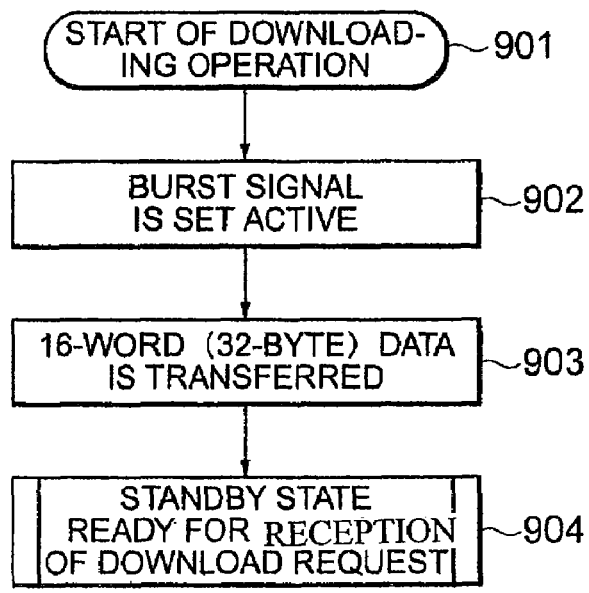
FIG. 14 is a flow chart for describing an example of operation of a master device in the second embodiment.
Figure 15:
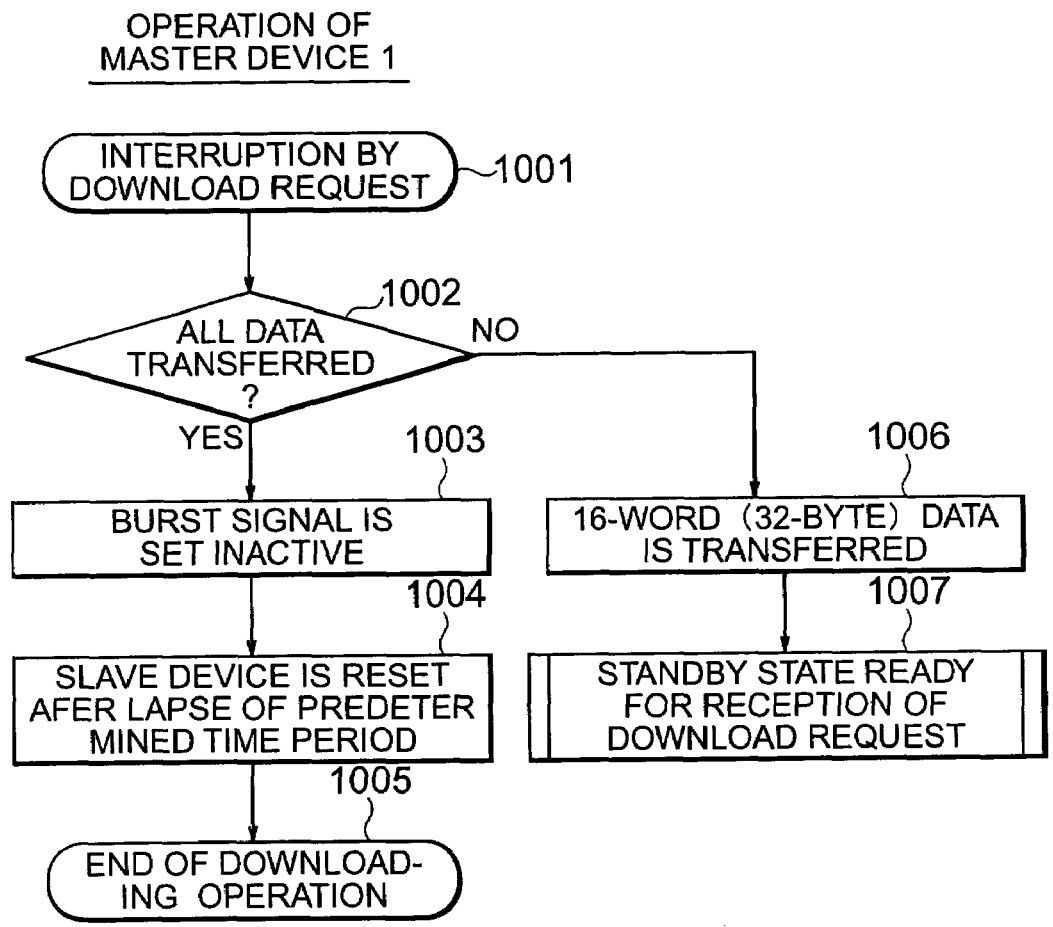
FIG. 15 is a flow chart for describing another example of operation of the master device in the second embodiment.
Figure 16:
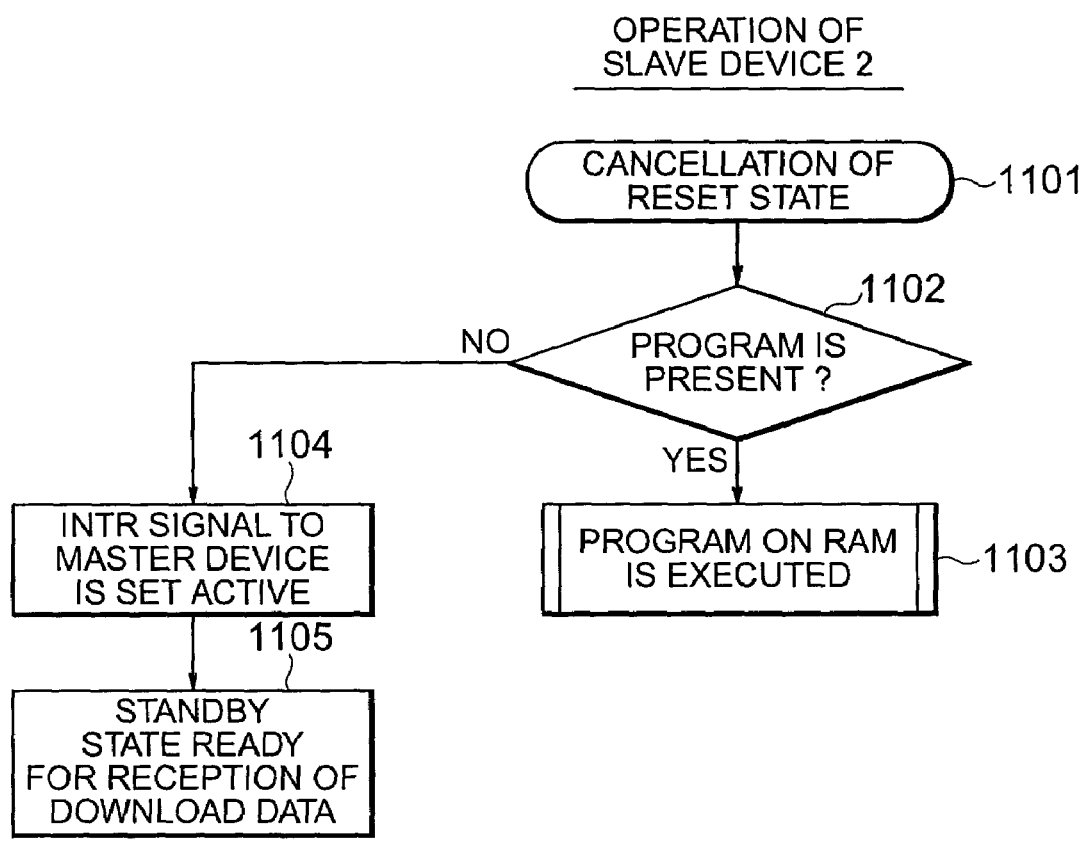
FIG. 16 is a flow chart for describing an example of operation of a slave device in the second embodiment.
Figure 17:
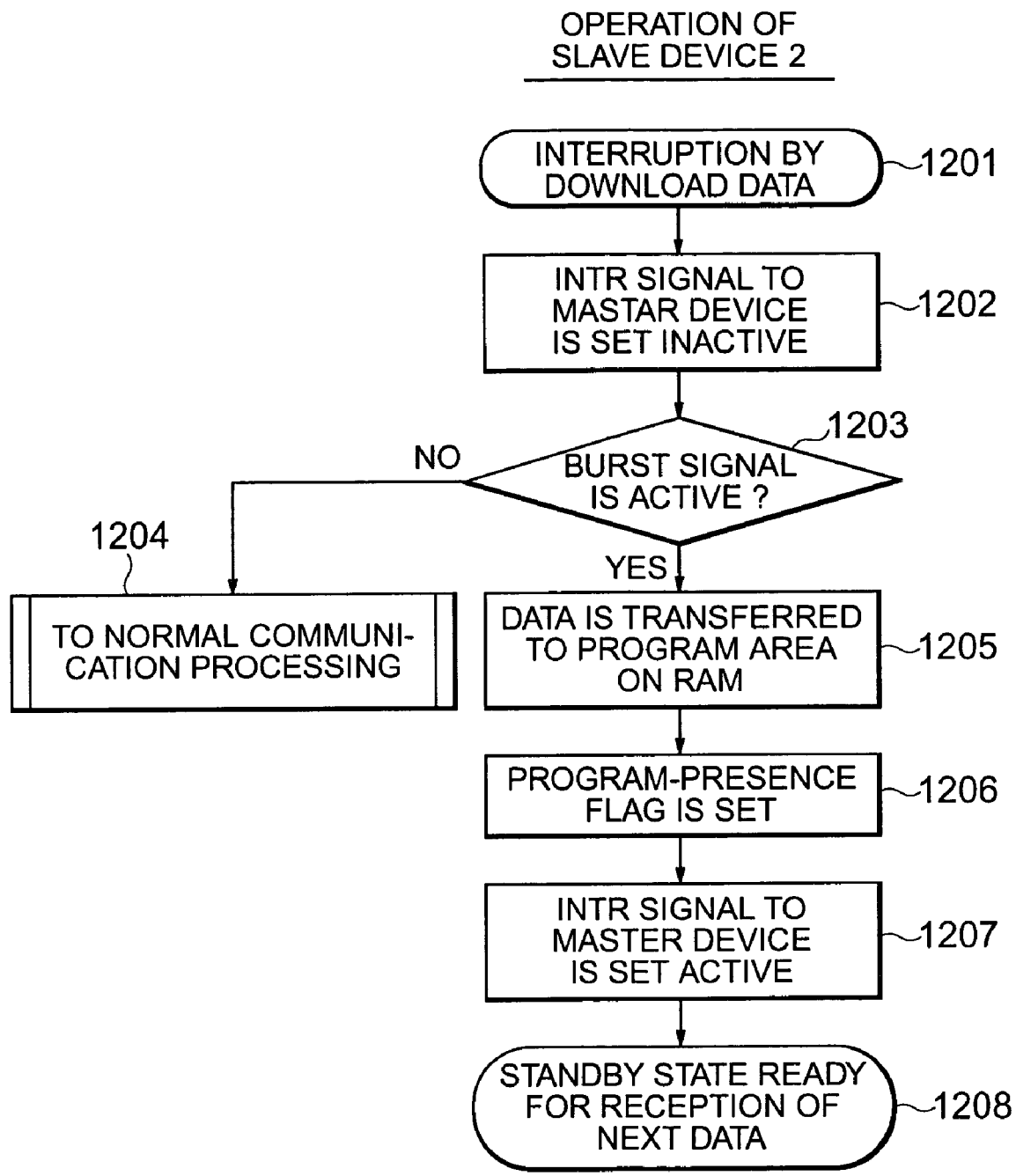
FIG. 17 is a flow chart for describing another example of operation of the slave device in the second embodiment.

Referring to FIGS. 14 and 15, operation of the master device 1 will be described. Referring to FIGS. 16 and 17, operation of the slave device 2 will be described.

At first referring to FIG. 16, the slave device 2 is started or the reset state is canceled (step 1101). The CPU 21 carries out the starting operation in accordance with the starting program on the ROM 24 and judges whether or not any program is present on the RAM 25 (step 1102). In presence of the program on the RAM 25, the CPU 21 executes the program on the RAM 25 (step 1103).

In absence of any program on the RAM 25, the CPU 21 sets an interrupt (INTR) signal to the master device 1 active in order to send a download request to the master device 1 (step 1104). Then, the CPU 21 is turned into a standby state ready for reception of download data (step 1105).

Referring to FIG. 14, the CPU 11 of the master device 1 starts the downloading operation of the program in response to the interrupt (INTR) signal from the slave device 2 (step 901) and sets the burst signal active (step 902).

Next, the CPU 11 modifies the format of the transmission data by treating the address field as the data field, and transfers first 16-word (32-byte) data of the program (step 903). The CPU 11 is turned into a standby state ready for reception of the download request from the slave device 2 (step 904).

Referring to FIG. 17, the slave device 2 receives the download data from the master device 1 in the state at the step 1105 in FIG. 16 (step 1201). Then, the CPU 21 sets the interrupt (INTR) signal to the master device 1 inactive (step 1202).

Next, the timing control circuit 226 judges whether or not the burst signal is active (step 1203). If the burst signal is not active, the timing control circuit 226 carries out control for normal communication processing (step 1204).

On the other hand, if the burst signal is active, the timing control circuit 226 makes the transmission FIFO 222 store the data in the address field of the download data from the master device 1 and makes the reception FIFO 224 store the data in the data field following the address field. Then, if the timing control circuit 226 sets the interrupt (INTR) signal active, the CPU 21 reads the data in the transmission FIFO 222 and in the reception FIFO 224, transfers the data to the program area on the RAM 25 (step 1205), sets the program-presence flag (step 1206), and sets the interrupt (INTR) signal to the master device 1 active (step 1207).

Thereafter, the CPU 21 is turned into a standby state ready for reception of next download data (step 1208).

Referring to FIG. 15, the master device 1 receives the download request in the state at the step 904 in FIG. 14 and when the interrupt (INTR) signal is set active (step 1001). Then, the CPU 11 judges whether or not transfer of all data of the program has been completed (step 1002).

If transfer of all data of the program has been completed, the CPU 11 sets the burst signal inactive (step 1003). Taking into account the processing time in the slave device 2, the CPU 11 resets the slave device 2 after lapse of a predetermined time period (step 1004). Then, the downloading operation comes to an end (step 1005).

On the other hand, if transfer of all data of the program has not been completed, the CPU 11 transfers 16-word (32-byte) data again (step 1006) and is turned into a standby state ready for reception of next download request (step 1007).

As described above, in this embodiment, it is possible to reliably confirm reception of the program between the master device 1 and the slave device 2 by every 16 words (32 bytes).

Third Embodiment

In the information processing apparatus according to a third embodiment, validity check is carried out when the program is downloaded from the master device 1 to the slave device 2. In the validity check, the judgment is made of validity of downloading, including the size of the program and a check sum. In this event, a hardware-based burst signal is unnecessary.

The information processing apparatus in this embodiment is similar in structure to the first embodiment except that the synchronous serial interface 22 in the slave device 2 has an internal structure different from that of the first embodiment.

Figure 18:
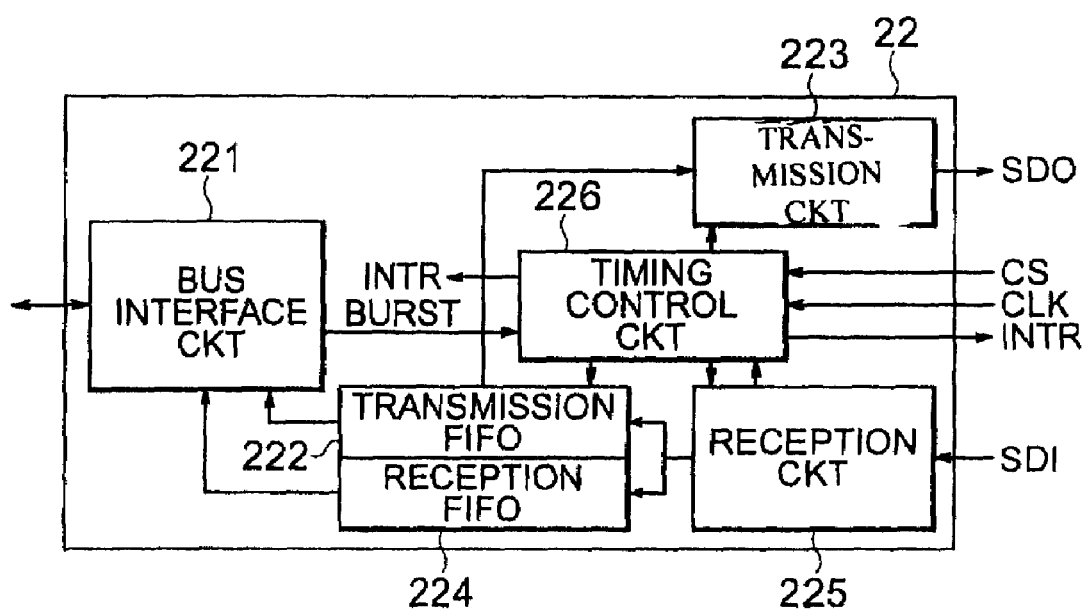
FIG. 18 is a view showing a synchronous serial interface according to a third embodiment of this invention.

Referring to FIG. 18, the synchronous serial interface 22 according to the third embodiment is different from the second embodiment in FIG. 13 in the following respects. The CPU 21 in the slave device 2 is responsive to a command from the CPU 11 in the master device 1 and sends the burst signal through the bus interface circuit 221 to the timing control circuit 226. The interrupt (INTR) signal to the master device 1 is set active by the CPU 21 and is cleared or turned inactive on a hardware basis when the data is received from the master device 1.

Next, operation of this embodiment will be described. Herein, description will be made about the case where the slave device 2 downloads the program from the master device 1 via four-wire synchronous serial communication.

Figure 19:
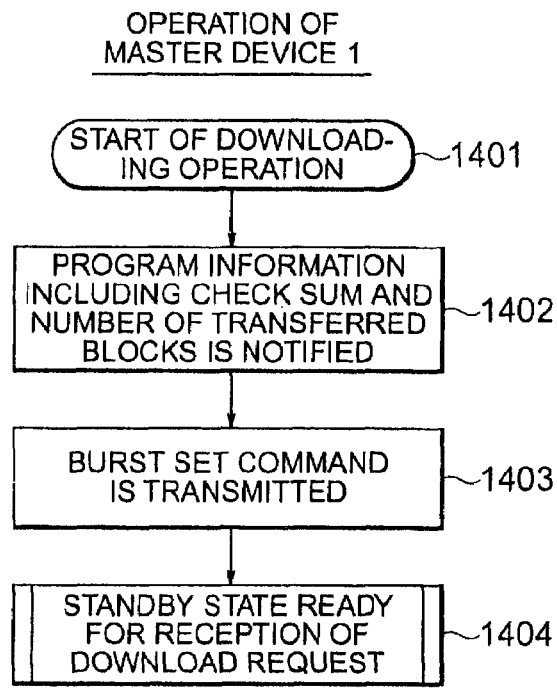
FIG. 19 is a flow chart for describing an example of operation of a master device in the third embodiment.
Figure 20:
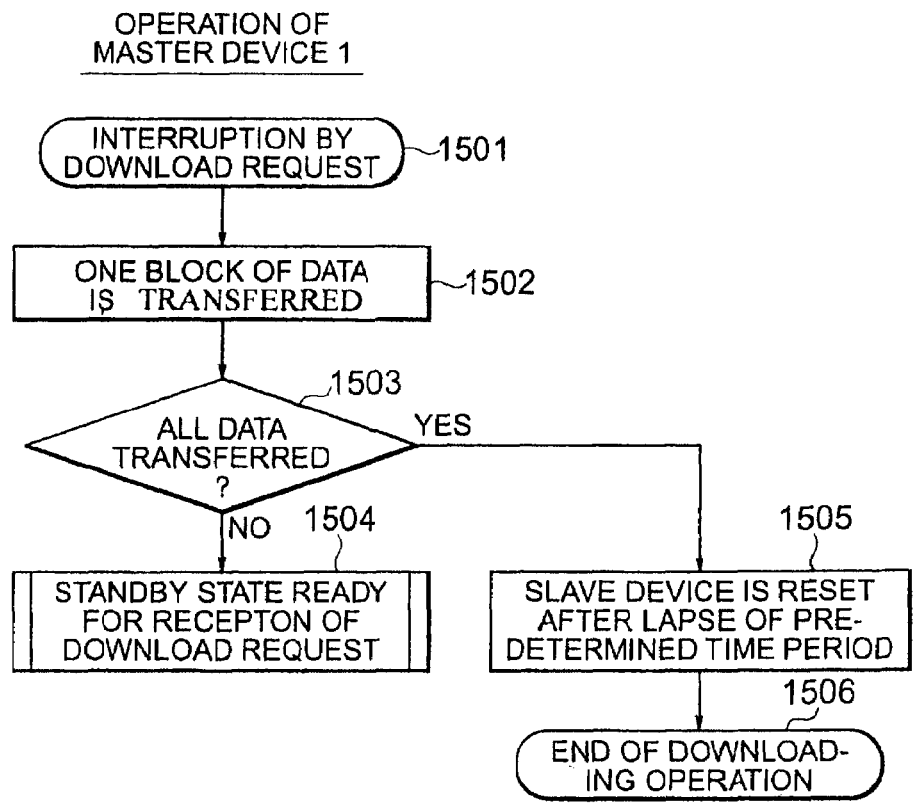
FIG. 20 is a flow chart for describing another example of operation of the master device in the third embodiment.

Referring to FIGS. 19 and 20, operation of the master device 1 will be described. Referring to FIGS. 21 through 24, operation of the slave device 2 will be described. In FIG. 24, CLK and SDO represent a clock and output data or serial-data-out produced by the master device 1. INTR represents the interrupt (INTR) signal produced by the slave device 2. In FIG. 24, A and D in the output data SDO represent those fields treated as an address field and a data address field, respectively.

Figure 21:
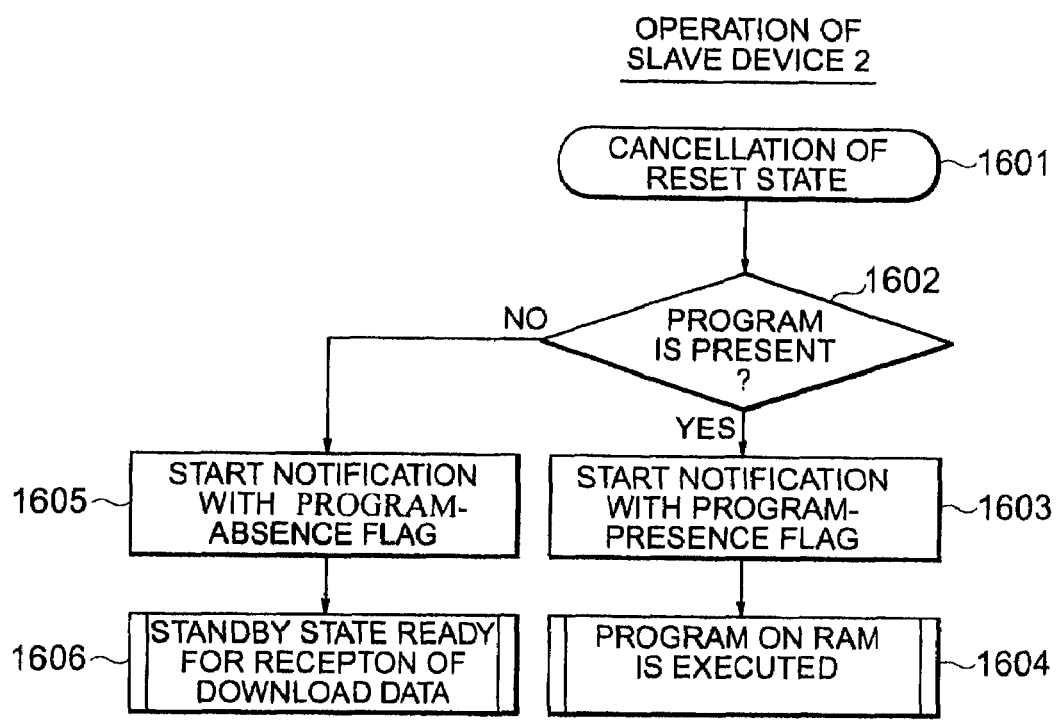
FIG. 21 is a flow chart for describing an example of operation of a slave device in the third embodiment.

Referring to FIG. 21, the slave device 2 is started or the reset state is canceled (step 1601). The CPU 21 carries out a starting operation in accordance with a starting program on the ROM 24 and judges whether or not any program is present on the RAM 25 (step 1602).

In presence of the program on the RAM 25, the CPU 21 sets a program-presence flag, issues a start notification to the master device 1 (step 1603), and executes the program on the RAM 25 (step 1604).

On the other hand, in absence of any program on the RAM 25, the CPU 21 sets a program-absence flag and issues the start notification to the master device 1 (step 1605). Then, the CPU 21 is turned into a standby state ready for reception of download data (step 1606).

Referring to FIG. 19, in the master device 1, the CPU 11 is responsive to the content of the start notification issued by the slave device 2 and judges whether or not downloading is required. If downloading is necessary, the downloading operation is started (step 1401).

Prior to downloading of the program, the CPU 11 transmits, to the slave device 2, program information about the program to be downloaded (step 1402, between the time instants t1 and t2 in FIG. 24). In this embodiment, the CPU 11 sets, as the program information, a check sum for the overall program and the number of all blocks of data to be transferred where each block contains 32 bytes. The CPU may set other information, such as a destination address, as the program information.

After transmission of the program information, the CPU 11 transmits to the slave device 2 a burst set command for setting the synchronous serial interface 22 in the slave device 2 into the burst mode (step 1403, at a time instant t3 in FIG. 24).

Thereafter, the CPU 11 is turned into a standby state ready for reception of the download request from the slave device 2 (step 1404).

Figure 23:
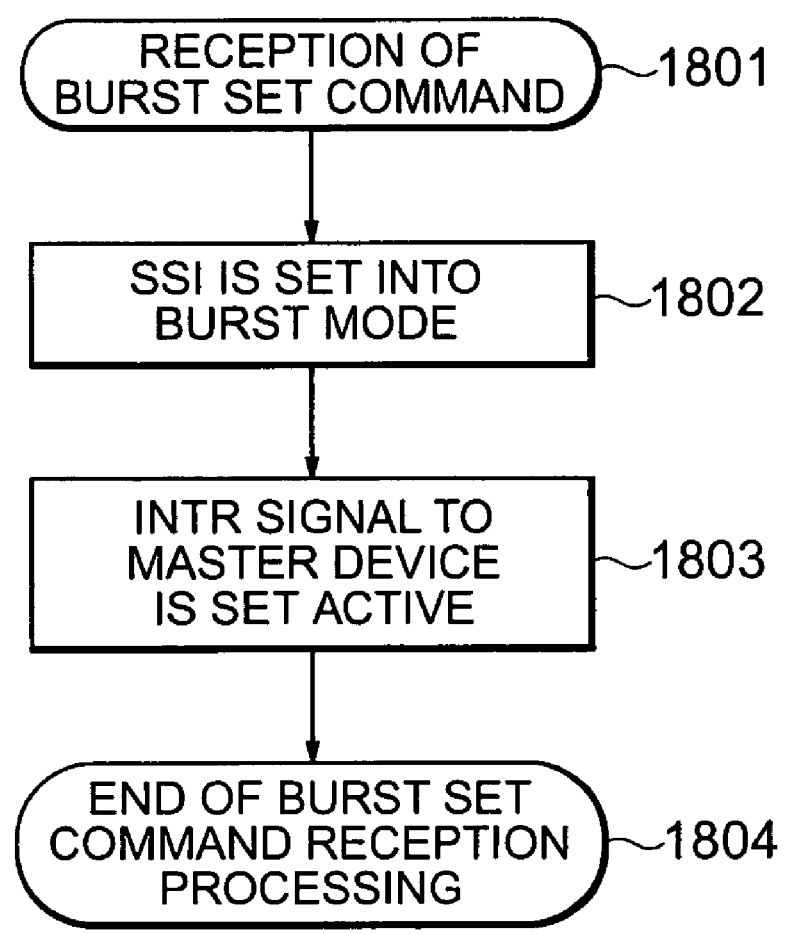
FIG. 23 is a flow chart for describing still another example of operation of the slave device in the third embodiment.
Figure 24:
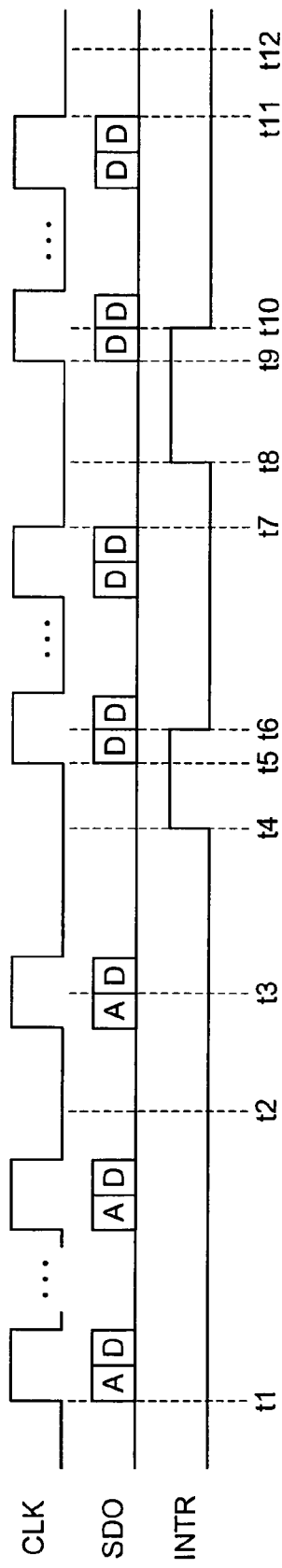
FIG. 24 is a timing chart for describing operation of the slave device in the third embodiment in a simplified manner.

Referring to FIG. 23, the slave device 2 receives the burst set command from the master device 1 (step 1801). In this event, the CPU 21 sets the synchronous serial interface 22 into the burst mode through the bus control circuit 27 (step 1802).

Thereafter, the CPU 21 sets the interrupt (INTR) signal to the master device 1 active (step 1803, at time instants t4 and t8 in FIG. 24). Then, operation of receiving the burst set command comes to an end (step 1804).

Referring to FIG. 20, it is assumed that the master device 1 receives the download request in the state at the step 1404 in FIG. 19 and when the interrupt (INTR) signal is set active (step 1501, at the time instant t4 in FIG. 24).

Then, the CPU 11 modifies the format of the transmission data by treating the address field as the data field, and transfers one block of the program (step 1502, between time instants t5 and t7 and between time instants t9 and t1 in FIG. 24). The CPU 11 judges whether or not transfer of all blocks of the program has been completed (step 1503). If transfer of all blocks has not been completed, the CPU 11 is turned into a standby state ready for reception of the download request (step 1504).

On the other hand, if transfer of all blocks has been completed, the CPU 11 resets the slave device 2 after lapse of a predetermined time period, taking into account the processing time in the slave device 2 (step 1505). Then, the downloading operation comes to an end (step 1506).

Figure 22:
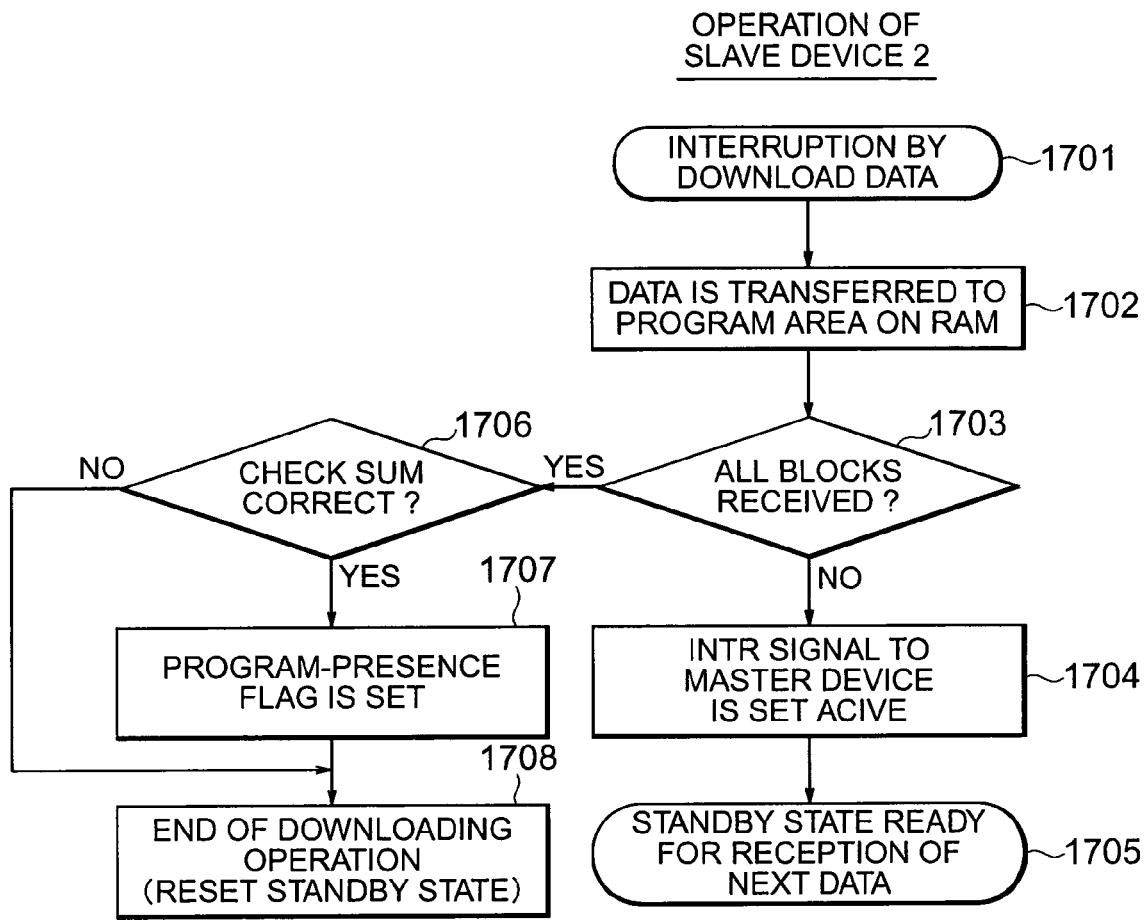
FIG. 22 is a flow chart for describing another example of operation of the slave device in the third embodiment.

Referring to FIG. 22, the slave device 2 receives the download data from the master device 1 in the state at the step 1606 in FIG. 21 (step 1701). In this event, the timing control circuit 226 makes the transmission FIFO 222 store the data in the address field of the download data from the master device 1 and makes the reception FIFO 224 store the data in the data field following the address field. When the timing control circuit 226 sets the interrupt (INTR) signal active, the CPU 21 transfers the reception data to the program area on the RAM 25 (step 1702).

Next, the CPU 21 judges whether or not reception of all of the blocks has been completed (step 1703). Herein, the number of blocks is preliminarily notified as the program information. If reception has not been completed, the interrupt (INTR) signal to the master device 1 is set active (step 1704, at the time instant t8 in FIG. 24). Then, the CPU is turned into a standby state ready for reception of a next block of the download data (step 1705).

On the other hand, in case where reception of all of the blocks has been completed, the CPU 21 calculates the check sum and judges whether or not the calculation is correct (step 1706). If the calculation of the check sum is correct, a program-presence flag is set (step 1707). Then, the downloading operation comes to an end and the CPU 21 is turned into a reset standby state (step 1708). In this event, the interrupt (INTR) signal to the master device 1 is not set active, the master device 1 can recognize that the downloading operation of all of the blocks has been carried out (a time instant t12 in FIG. 24).

If the calculation of the check sum is incorrect, the CPU 21 does not set the program-presence flag and finishes the downloading operation.

As described above, in this embodiment, the validity check of the downloading operation, including the size of the program and the check sum, is carried out upon downloading the program. Therefore, it is possible to improve the validity of the downloading operation.

While this invention has thus far been described in conjunction with the preferred embodiments thereof, it will be readily possible for those skilled in the art to put this invention into practice in various other manners without departing from the scope set forth in the appended claims.

What is claimed is:

1. An integrated circuit having a CPU for downloading a program from another integrated circuit via serial communication and executing the program, wherein:

the integrated circuit comprises an interface circuit for judging that a format of reception data is modified if the interface circuit is set in a specific mode and judging that the format of reception data is normal if the interface circuit is not set in the specific mode, and extracting the program from the reception data when the reception data containing the program is downloaded and received from the above-mentioned another integrated circuit, wherein the interface circuit comprises:

a transmission memory for storing transmission data to be transmitted to the above-mentioned another integrated circuit during a normal mode;

a reception memory for storing the program contained in the reception data received from the above-mentioned another integrated circuit during the normal mode; and a timing control circuit for carrying out control such that, during the normal mode, the program contained in the reception data received from the above-mentioned another integrated circuit is stored only in the reception memory and that, during the specific mode, the program contained in the reception data received from the above-mentioned another integrated circuit is stored in both of the transmission memory and the reception memory.

2. The integrated circuit according to claim 1, wherein:

the interface circuit judges, when the reception data containing the program is received from the above-mentioned another integrated circuit and if the interface circuit is set in the specific mode, that the program is contained not only in a data field of the reception data but also in a field other than the data field, and extracts the program from the reception data.

3. The integrated circuit according to claim 1, wherein:

the interface circuit is set in the specific mode in response to a signal transmitted from the above-mentioned another integrated circuit.

4. The integrated circuit according to claim 1, wherein:

the CPU sets the interface circuit in the specific mode in response to a command transmitted from the above-mentioned another integrated circuit.

5. An information processing apparatus comprising a first integrated circuit and a second integrated circuit having a CPU for downloading a program from the first integrated circuit via serial communication and executing the program, wherein:

the second integrated circuit comprises an interface circuit for judging that a format of reception data is modified if the interface circuit is set in a specific mode and judging that the format of reception data is normal if the interface circuit is not set in the specific mode, and extracting the program from the reception data when the reception data containing the program is downloaded and received from the first integrated circuit, wherein the interface circuit comprises:

a transmission memory for storing transmission data to be transmitted to the first integrated circuit during a normal mode;

a reception memory for storing the program contained in the reception data received from the first integrated circuit during the normal mode; and a timing control circuit for carrying out control such that, during the normal mode, the program contained in the reception data received from the first integrated circuit is stored only in the reception memory and that, during the specific mode, the program contained in the reception data received from the first integrated circuit is stored in both of the transmission memory and the reception memory.

6. The information processing apparatus according to claim 5, wherein:

the interface circuit judges, when the reception data containing the program is received from the first integrated circuit and if the interface circuit is set in the specific mode, that the program is contained not only in a data field of the reception data but also in a field other than the data field, and extracts the program from the reception data.

7. The information processing apparatus according to claim 5, wherein:

the interface circuit is set in the specific mode in response to a signal transmitted from the first integrated circuit.

8. The information processing apparatus according to claim 5, wherein:

the CPU sets the interface circuit in the specific mode in response to a command transmitted from the first integrated circuit.

9. The integrated circuit according to claim 1, wherein the timing control circuit controls the transmission memory to store the data in the field other than the data field of the reception data and controls the reception memory to store the data in the data field of the reception data, if the interface circuit is set in the specific mode.

10. The information processing apparatus according to claim 5, wherein the timing control circuit controls the transmission memory to store the data in the field other than the data field of the reception data and controls the reception memory to store the data in the data field of the reception data, if the interface circuit is set in the specific mode.

11. The integrated circuit according to claim 1, wherein if the timing control circuit sets an interrupt signal active, the CPU reads the data in the transmission memory and in the reception memory, transfers the data to a program area of a Random Access Memory (RAM), and sets a interrupt signal to the above-mentioned another integrated circuit.

12. The integrated circuit according to claim 11, wherein if the interrupt signal to the above-mentioned another integrated circuit is set active, a CPU of the above-mentioned another integrated circuit judges whether or not transfer of all data of the program has been complete.

13. The integrated circuit according to claim 1, wherein the transmission memory and the reception memory are different.

14. The information processing apparatus according to claim 5, wherein the transmission memory and the reception memory are different.

15. The integrated circuit according to claim 2, wherein the field other than the data field is an address field.

16. The information processing apparatus according to claim 6, wherein the field other than the data field is an address field.

17. The integrated circuit according to claim 1, wherein the interface circuit is a synchronous serial interface circuit.

18. The information processing apparatus according to claim 5, wherein the interface circuit is a synchronous serial interface circuit.

* * * * *